United States Patent
Eng et al.

(10) Patent No.: US 10,220,408 B2
(45) Date of Patent: Mar. 5, 2019

(54) VARIABLE RADIUS PRINT HEAD END EFFECTOR

(71) Applicant: The Boeing Company, Chicago, IL (US)

(72) Inventors: Raymond C. Eng, Burien, WA (US); Kyle S. Biondich, Bothell, WA (US); Justin T Hoehn, Mountlake, WA (US); Bennett M. Moriarty, Bothell, WA (US); Matthew H. Mellin, Charleston, SC (US); Dhananjay B. Vasa, Columbus, OH (US); George P. Halamandaris, Newport, CA (US); John E. Miller, Ladson, SC (US); Jeffrey H. Olberg, Federal Way, WA (US); Shane E. Arthur, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/262,597

(22) Filed: Sep. 12, 2016

(65) Prior Publication Data
US 2018/0071773 A1    Mar. 15, 2018

(51) Int. Cl.
*B05D 1/02*    (2006.01)
*B41J 2/01*    (2006.01)
(Continued)

(52) U.S. Cl.
CPC .................. *B05D 1/02* (2013.01); *B05B 1/14* (2013.01); *B05B 12/04* (2013.01); *B05B 12/124* (2013.01);
(Continued)

(58) Field of Classification Search
CPC ................ B05D 1/02; B41J 2/01; B41J 3/407
(Continued)

(56) References Cited

U.S. PATENT DOCUMENTS 4,401,699 A * 8/1983 Baskett ............... B05B 13/0405
                                                                427/445
5,740,962 A    4/1998 Manor et al.
(Continued)

FOREIGN PATENT DOCUMENTS

EP    1884365 A1    2/2008
EP    2108515 A1    10/2009
(Continued)

OTHER PUBLICATIONS

Search Report for related European Application No. EP17190473.3; report dated Jan. 17, 2018.

*Primary Examiner* — Alexander M Weddle
(74) *Attorney, Agent, or Firm* — Miller, Matthias & Hull LLP

(57) ABSTRACT

A surface treatment assembly for treating a contoured surface includes an adjustable base having at least a first contour shape and a second contour shape. The surface treatment assembly further includes a plurality of applicator heads that are coupled to the adjustable base. Moreover, each applicator head is configured to apply a surface treatment to the contoured surface. Furthermore, the surface treatment assembly includes an actuator which is operatively coupled to the adjustable base and the actuator is configured to manipulate the adjustable base between the first contour shape and the second contour shape.

20 Claims, 6 Drawing Sheets

(51) Int. Cl.
*B41J 3/407* (2006.01)
*B05B 1/14* (2006.01)
*B05B 12/04* (2006.01)
*B05B 12/12* (2006.01)
*B05B 13/00* (2006.01)
*B64F 5/10* (2017.01)
*B05B 15/68* (2018.01)
*B41J 25/00* (2006.01)
*B05B 13/04* (2006.01)

(52) U.S. Cl.
CPC ............ *B05B 13/005* (2013.01); *B05B 15/68* (2018.02); *B41J 2/01* (2013.01); *B41J 3/407* (2013.01); *B41J 3/4073* (2013.01); *B41J 25/00* (2013.01); *B64F 5/10* (2017.01); *B05B 13/0431* (2013.01); *B05B 13/0436* (2013.01)

(58) Field of Classification Search
USPC ....................................................... 427/427.2
See application file for complete search history.

(56) References Cited

U.S. PATENT DOCUMENTS

| | | | |
|---|---|---|---|
| 9,339,670 B1 | 5/2016 | Burnham et al. | |
| 2005/0042016 A1* | 2/2005 | Healy | B05C 1/08 |
| | | | 401/48 |
| 2005/0265798 A1* | 12/2005 | Boyl-Davis | B23Q 9/0014 |
| | | | 408/76 |
| 2007/0062383 A1* | 3/2007 | Gazeau | B41J 3/4073 |
| | | | 101/35 |
| 2009/0257070 A1* | 10/2009 | Baird | B41J 3/4073 |
| | | | 358/1.5 |
| 2014/0295100 A1* | 10/2014 | Baskerville | H05B 6/36 |
| | | | 427/543 |

FOREIGN PATENT DOCUMENTS

| | | |
|---|---|---|
| EP | 2848421 A1 | 3/2015 |
| EP | 0120933 A1 | 1/2017 |

\* cited by examiner

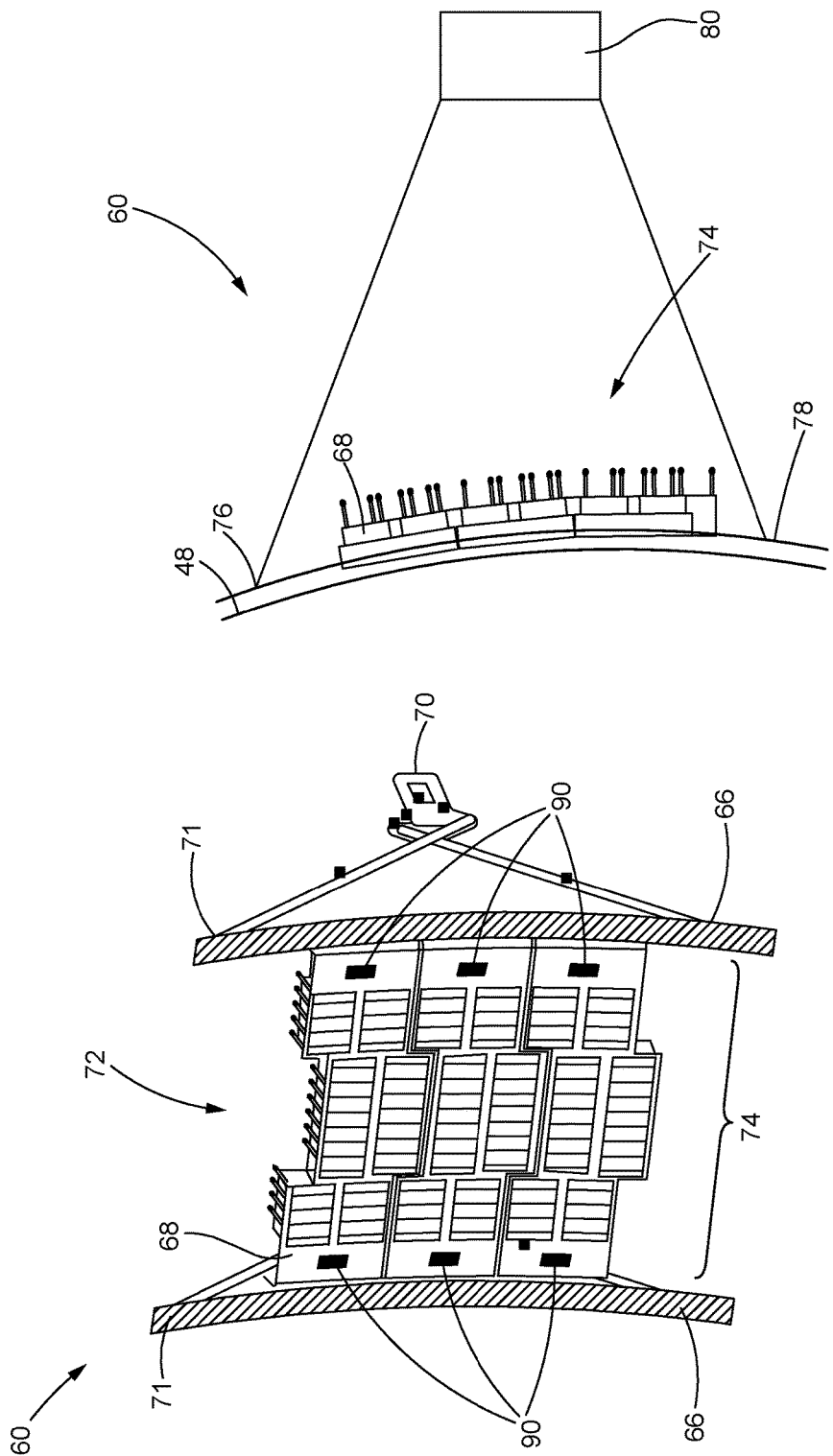

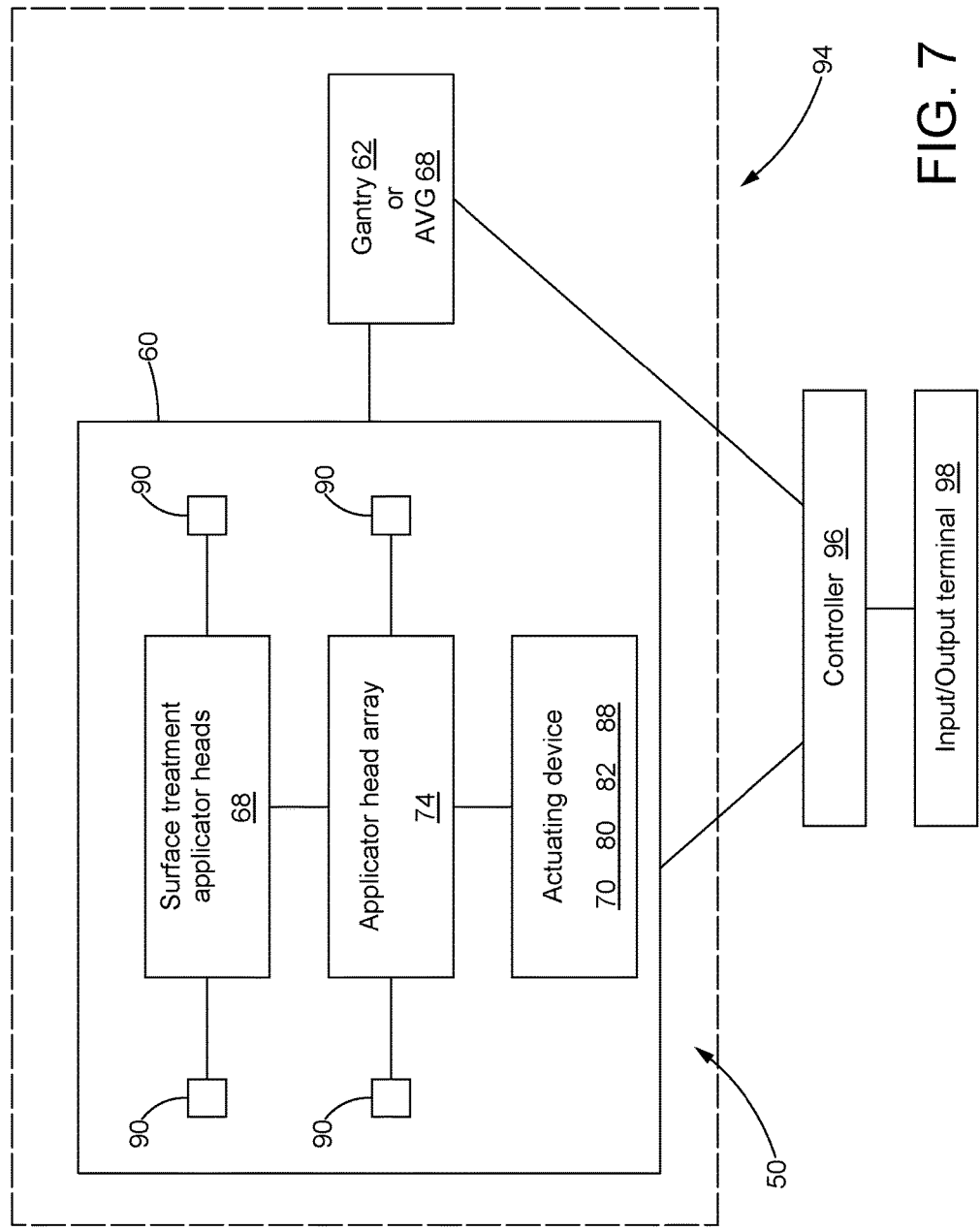

VARIABLE RADIUS PRINT HEAD END EFFECTOR

FIELD

The present disclosure relates generally to automated surface treatment systems and methods, and more specifically to automated surface treatment systems and methods for contoured surfaces.

BACKGROUND

Treating and coating structural surfaces of machines, such as commercial aircraft, is a long and extensive process. Surface treatment often requires coating a structural surface that includes a variety of large contoured surfaces. Furthermore, coating the structural surfaces includes applying multiple layers of coatings for engineering properties, as well as to apply a decorative livery. The decorative livery is applied using a complex process which requires a series of masking operations followed by applying colored paints or coatings where they are needed. These masking and painting operations are serially repeated until the exterior surface treatment is completed. Performing these processes on large areas with a variety of contoured surfaces, therefore, requires a significant amount of time and resources.

SUMMARY

In accordance with one aspect of the present disclosure a surface treatment assembly for treating a contoured surface is disclosed. The surface treatment assembly includes an adjustable base having at least a first contour shape and a second contour shape. The surface treatment assembly further includes a plurality of applicator heads that are coupled to the adjustable base. Moreover, each applicator head is configured to apply a surface treatment to the contoured surface. Furthermore, the surface treatment assembly includes an actuator which is operatively coupled to the adjustable base and the actuator is configured to manipulate the adjustable base between the first contour shape and the second contour shape.

In accordance with another aspect of the present disclosure, a method for treating a target area of a contoured surface is disclosed. The method of treating the target area of the contoured surface includes providing a plurality of applicator heads on an adjustable base and each applicator head being configured to apply a surface treatment to the contoured surface. The method of treating the target area of the contoured surface further includes determining an existing shape of the contoured surface and manipulating the adjustable base with an actuator to a desired contoured shape based on the determined existing shape of the contoured surface, thereby positioning the applicator heads adjacent to the target area according to the shape of the contoured surface. Additionally, the method of treating the target area of the contoured surface includes selectively operating the plurality of applicator heads to apply the surface treatment to the target area of the contoured surface.

In accordance with yet another aspect of the present disclosure, a surface treatment system for treating an exterior surface of an airplane is disclosed. The surface treatment system includes an adjustable base having at least a first radius and a second radius. The surface treatment system further includes a plurality of applicator heads coupled to the adjustable base, and each applicator head being configured to apply a surface treatment to the exterior surface of the airplane. Moreover, an actuator is operatively coupled to the adjustable base and configured to manipulate the adjustable base between the at least first radius and the second radius. Additionally, the surface treatment system includes a controller that is communicably coupled to the actuator and the controller is programmed to operate the actuator to manipulate the adjustable base to the first radius or the second radius, and to selectively operate the plurality of applicator heads to apply a surface treatment to the exterior surface of the airplane.

The features, functions, and advantages disclosed herein can be achieved independently in various embodiments or may be combined in yet other embodiments, the details of which may be better appreciated with reference to the following description and drawings.

BRIEF DESCRIPTION OF THE DRAWINGS

FIG. 3 is a perspective view of an exemplary surface treating assembly in accordance with the present disclosure;

FIG. 4 is a side view of another embodiment of the surface treating assembly in accordance with the present disclosure;

FIG. 7 is a schematic view of an exemplary control and communication system in accordance with the present disclosure.

It should be understood that the drawings are not necessarily to scale, and that the disclosed embodiments are illustrated diagrammatically, schematically, and in some cases in partial views. In certain instances, details which are not necessary for an understanding of the disclosed methods and apparatuses or which render other details difficult to perceive may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION

The following detailed description is intended to provide both methods and devices for carrying out the disclosure. Actual scope of the disclosure is as defined by the appended claims.

Figure 1:
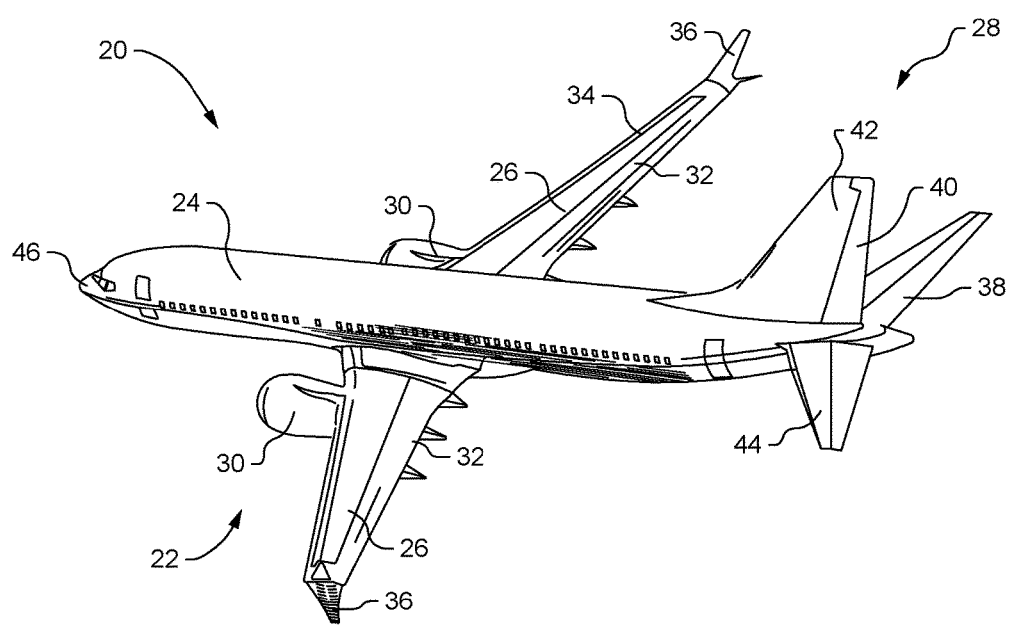
FIG. 1 is a perspective view of an exemplary vehicle constructed in accordance with the present disclosure.

Referring to FIG. 1, a vehicle 20 is illustrated. One non-limiting example of the vehicle 20 is that of an aircraft; however the present disclosure applies to other types of vehicles and machines as well. As illustrated, the vehicle 20 is configured with an airframe 22 which includes a fuselage 24, wings 26, and a tail section 28. In some embodiments, one or more propulsion units 30 are coupled to each wing 26 in order to propel the vehicle 20 in a direction of travel. Furthermore, the wings 26 are fixedly attached to the fuselage 24 and the propulsion units 30 are attached to an underside surface of the wing 26, however other attachment locations of the propulsion units 30 are possible. In some embodiments, the wings 26 are positioned at a substantially centered position along the fuselage 24, and the wings 26 are configured to include a plurality of flaps 32, leading edge devices 34, and peripheral edge devices 36 (i.e., winglets). Moreover, during operation of the vehicle 20, the flaps 32, leading edge devices 34 and peripheral edge devices 36 are capable of being adjusted in a plurality of positions in order to control and stabilize the vehicle 20. For example, the flaps 32 and leading edge devices 34 are adjustable in several different positions to produce the desired lift characteristics of the wings 26. Additionally, the tail section 28 of the airframe 22 includes components which provide other stability and maneuverability functions of the vehicle 20, such as an elevator 38, a rudder 40, a vertical stabilizer fin 42, and a horizontal stabilizer 44.

Figure 2:
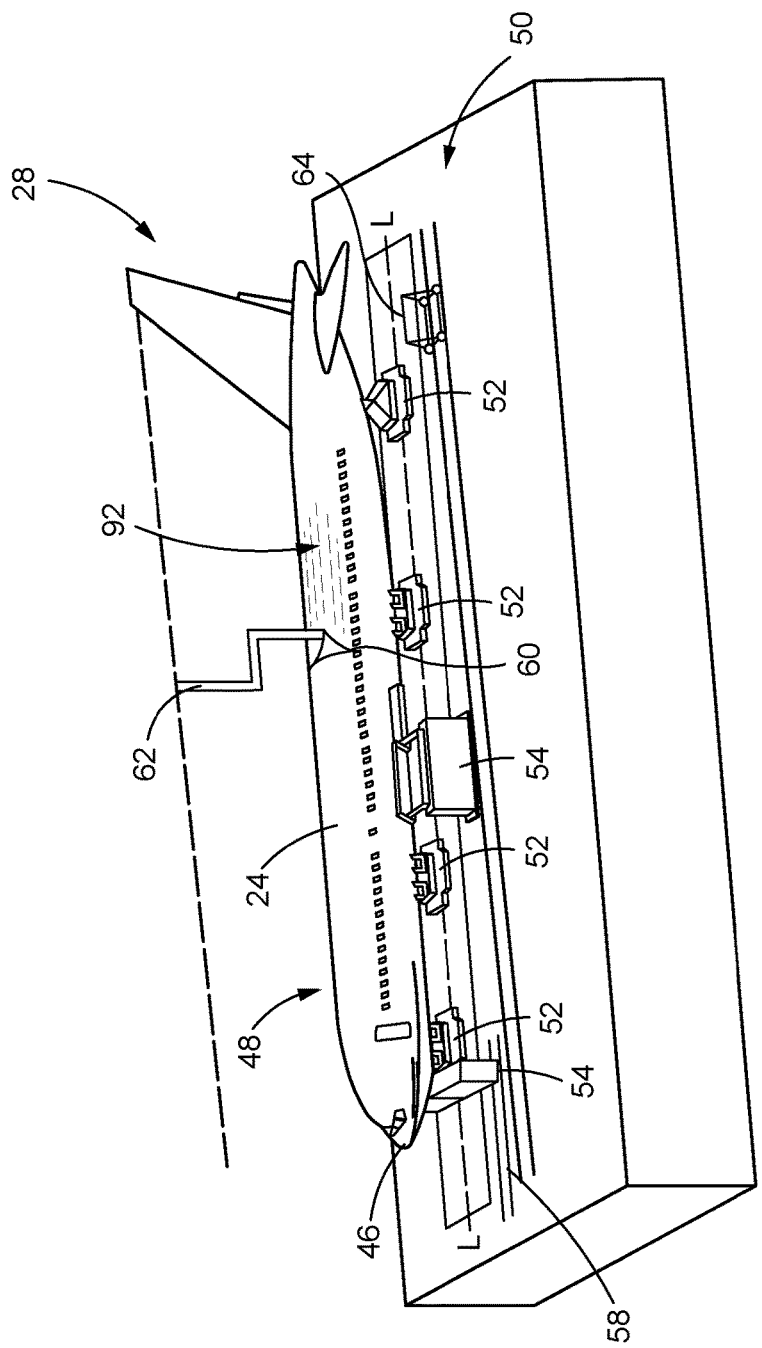
FIG. 2 is a perspective view of an exemplary contoured surface, and surface treating assembly in accordance with the present disclosure.

FIG. 2 illustrates one non-limiting example of the fuselage 24, with the tail section 28 attached. Generally, the fuselage 24 and other components of the vehicle 20 are constructed out of aluminum, aluminum alloy, titanium, carbon composite, or other known material. Moreover, the fuselage 24 forms a tubular structure of the vehicle 20. In some embodiments, a nose portion 46 is designated as the front of the fuselage 24 and the tail section 28 is designated as the rear of the fuselage 24. Additionally, the fuselage 24 is a tubular structure which exhibits changing dimensions and topography along the length of the fuselage 24 between the nose portion 46 and the tail section 28. As a result, the fuselage 24 is often described as having a contoured profile or surface 48. In one embodiment, the contoured surface 48 includes a variety of surface profiles formed by a series of changing surface geometries of the fuselage 24 and other vehicle 20 components. For example, moving along the fuselage 24 from the nose 46 to the tail section 28 the contoured surface 48 exhibits changing geometries and profiles such as but not limited to, an increase or decrease in diameter, a convex surface, a concave surface, or other such surface geometries and profiles or combination thereof.

During vehicle 20 manufacture and/or servicing, the fuselage 24, and other vehicle components, is positioned within a work area 50 and prepared for one or more manufacturing and/or scheduled service steps. In some embodiments, the manufacturing and/or servicing of the vehicle 20 includes applying a surface treatment on the contoured surface 48 along the fuselage 24, wings 26, tail section 28, or other portions of the vehicle. Generally, the surface treatment of the contoured surface 48 includes one or more of cleaning, abrading, priming, painting, protecting, repairing, or other known surface treatments of the contoured surface 48. Moreover, one non-limiting example of the surface treatments include decorative livery coatings, which not only provide surface protection against the harsh environmental conditions encountered by the vehicle 20, but also create a decorative design on the fuselage 24 which helps to identify and distinguish the one vehicle 20 from another.

As further illustrated in FIG. 2, the fuselage 24 is prepared for surface treatments by positioning the fuselage 24 within the work area 50 prior to attaching, or otherwise coupling, the wings 26 and other components to the vehicle 20. However, in alternative embodiments, such as but not limited to, during service or maintenance of the vehicle 20, the surface treatment is possible with the wings 26, the tail section 28 and other components already attached to vehicle 20. Prior to the start of the surface treatment, the fuselage 24 is delivered to the work area 50 by a plurality of automated guided vehicles 52 (AGVs). The AGVs are positioned along the underside of the fuselage 24 to provide adequate support and configured to move the fuselage 24 into position. While FIG. 2 shows the use of four AGVs 52, other numbers of AGVs 52 (i.e., fewer or greater) are certainly possible.

After the AGVs 52 move the fuselage into the work area 50 one or more structures are positioned along the underside of the fuselage 24 to provide support during the surface treatment. In some embodiments, a nose support structure 54 is located on the underside of the nose portion 46 of the fuselage 24 and a central support structure 56 is positioned underneath of the central portion of the fuselage 24. Additionally, while the nose support structure 54 and the central support structure 56 are shown in FIG. 2, one or more additional support structures can be placed in other places along the fuselage 24 which require support, such as but not limited to, underneath the tail section 28.

In one non-limiting embodiment, the nose and central support structures 54, 56 are slidably supported by a set of support structure rails 58 and the nose and central support structures 54, 56 slide along the support structure rails 58 and are positioned underneath the fuselage 24 to ensure the fuselage 24, or other component of the vehicle 20, is properly supported. Furthermore, the nose and central support structures 54, 56 are configured such that they are able to move along the support structure rails 58 without interfering with the AGVs 52. As a result, the AGVs 52 are capable of being used along with the nose and central support structures 54, 56 to support the fuselage 24, or other component of the vehicle 20, during surface treatment. While FIG. 2 illustrates the use of AGVs 52 and the nose and central support structures 54, 56 to transport and support the fuselage 24 and other components of the vehicle 20, it will be known to those skilled in the art that other methods of positioning, supporting and transporting the fuselage 24 and other vehicle 20 components are possible.

As further illustrated in FIG. 2, the work area 50 is equipped with a surface treatment assembly 60 that is configured to treat the contoured surface 48 of the vehicle 20. In some embodiments, the surface treatment assembly 60 is attached to a gantry 62, which is configured to provide support and movement of the surface treatment assembly 60 within the work area 50. In one non-limiting example, the gantry 62 is attached to an overhead structure that runs the length L-L of the work area 50 that houses the fuselage 24 or other components of the vehicle 20 during surface treatment. The gantry 62 is configured to move the surface treatment assembly 60 along the length L-L of the work area 50 as it treats the contoured surface 48 of the vehicle 20.

Alternatively, instead of using the gantry 62, the surface treatment assembly 60 is mounted on a surface treatment AGV 64, similar to the AGVs 52 used to move the fuselage in and out of the work area 50. The surface treatment AGV 64 is configured to move along the length L-L of the work area 50 as the surface treatment assembly 60 treats the contoured surface 48 of the vehicle 20. In one embodiment, the surface treatment AGV 64 is coupled to a set of AGV rails 65, which are positioned laterally alongside the fuselage 24 and configured to run along the length L-L of the work area 50. Furthermore, some embodiments include two sets of the AGV rails 65 spaced apart within the work area 50 such that the fuselage 24 is capable of being positioned and substantially centered between the AGV rails 65. As a result, one or more surface treatment assemblies 60 are capable of being positioned on each side of the fuselage 24 during surface treatment of the contoured surface 48. In an alternative embodiment, the surface treatment AGV 64 is configured with a set of wheels or other ground engaging elements that do not require being mounted on the AGV rails 65, and the surface treatment AGV 64 travels along the floor of the work area 50 while the surface treatment assembly 60 treats the contoured surface 48 of the vehicle 20.

Referring now to FIG. 3, one example of the surface treatment assembly 60 is shown. The surface treatment assembly 60 includes an adjustable base 66, a plurality of surface treatment applicator heads 68, and at least one actuating device 70 coupled to the adjustable base 66 of the surface treatment assembly 60. The at least one actuating device 70 is configured to adapt the adjustable base 66 of the surface treatment assembly 60 to conform and follow the variety of surface geometries (i.e., increased/decreased radii, and convex/concave surfaces) encountered along the contoured surface 48 of the fuselage 24, or other component, of the vehicle 20. Moreover, in an exemplary configuration, the adjustable base 66 is shown to include two flexible support strips 71 which define a mounting space 72 for attaching the plurality of surface treatment applicator heads 68 to the surface treatment assembly 60. As a result, the surface treatment assembly 60, including the adjustable base 66, the plurality of surface treatment applicator heads 68, and the at least one actuating device 70, is configured to enable a versatile and resilient response to the complex geometries encountered along the contoured surface 48

Additionally, the surface treatment applicator heads 68 are attached to the flexible support strips 71 and arranged within the mounting space 72 such that the surface treatment applicator heads 68 forms an applicator head array 74. In one non-limiting example, the surface treatment applicator heads 68 are arranged in a staggered formation and each of the surface treatment applicator heads 68 are configured to be independently controllable. Moreover, the staggered arrangement of the surface treatment applicator heads 68 of the applicator head array 74 allows the surface treatment assembly 60 to make real-time adjustments to the orientation of the surface treatment applicator heads 68 according to various surface geometries of the contoured surface 48. Additionally, the staggered configuration of the applicator head array 74 to provides an overlap and/or redundancy of the surface treatment applicator heads 68 which allows the surface treatment assembly 60 to provide a uniform coating across the contoured surface 48, to account for the changing radius and contour of the fuselage 24, and/or other such conditions.

As discussed above, the adjustable base 66 and the flexible support strips 71 are configured to work with the at least one actuating device 70 to adjust and/or adapt the surface treatment assembly 60 according to the variable geometry of the contoured surface 48. As a result, in an embodiment, the adjustable base 66 and the flexible support strips 71 are formed out of a flexible composite material which includes carbon fiber, glass fiber, or similar material. Moreover, the actuating devices 70 are configured to adjust the adjustable base 66 and the flexible support strips 71 according to the various geometries and dimensions of the contoured surface 48.

As further illustrated in FIG. 3, one non-limiting example of the at least one actuating device 70 includes a scissor-type mechanical actuator coupled to the adjustable base 66 and the flexible support strips 71 of the surface treatment assembly 60. As the surface treatment assembly 60 moves along the contoured surface 48, the scissor-type actuating device 70 actuates the adjustable base 66 and flexible support strips 71 to change the radius (i.e., increase or decrease) and/or adjust other dimensions of the adjustable base 66 and flexible support strips 71. Such actuation and adjustment of the adjustable base 66 and flexible support strips 71 enables the surface treatment assembly 60 to follow the complex topography of the contoured surface 48. As a result, the surface treatment applicator heads 68 are positioned and orientated according to the actuation of the adjustable base 66 and flexible support strips 71 to ensure the applicator head array 74 is properly positioned (i.e., normal/orthogonal) relative to the contoured surface 48 of the fuselage 24.

Referring now to FIG. 4, an alternative embodiment of the surface treatment assembly 60, which uses an alternative adjustable base, alternative flexible support strips and/or an alternative actuating device, is shown. For example, the surface treatment assembly 60 includes a composite adjustable base 76, including a plurality of composite flexible support strips 78 composed of a composite material such as but not limited to, carbon-fiber, glass-fiber, or other such material combined with a deformable metal alloy such as nickel-titanium alloy (e.g., Nitinol), or other such deformable alloy. The surface treatment assembly 60 further includes the plurality of surface treatment applicator heads 68, arranged into the applicator head array 74, and at least one composite actuating device 80 coupled to the composite adjustable base 76 and the composite flexible support strips 78 of the surface treatment assembly 60.

In some embodiments, the deformable metal alloy (i.e., nickel-titanium alloy) included in the composite adjustable base 76 and composite flexible support strips 78 is a smart metal, or shape memory alloy capable of changing its shape. For example, when the temperature of the nickel-titanium alloy is controlled at a specified deformation temperature the composite adjustable base 76 deforms to conform to the contoured surface 48, or other such desired shape. Moreover, the nickel-titanium alloy is capable of recovering its original non-deformed shape upon controlling the alloy temperature at another specified temperature.

As such, in an embodiment, the at least one composite actuating device 80 is configured as a temperature regulating device, and the composite actuating device 80 is coupled to the composite adjustable base 76 and composite flexible support strips 78. Furthermore, the composite actuating device 80 is controlled by a controller 96 (FIG. 7) to increase or decrease the temperature of the nickel-titanium alloy. As a result, the composite adjustable base 76 and composite flexible support strips 78 adapt and/or deform the surface treatment assembly 60 to follow the contour of the contoured surface 48 of the vehicle 20. Moreover, the composite adjustable base 76 and composite flexible support strips 78 provide adjustment and flexibility capabilities to the surface treatment assembly 60 allowing it to conform and follow the topography and variety of surface geometries (i.e., increased/decreased radii, and convex/concave surfaces) encountered along the contoured surface 48 of the fuselage 24, or other component, of the vehicle 20.

Figure 5:
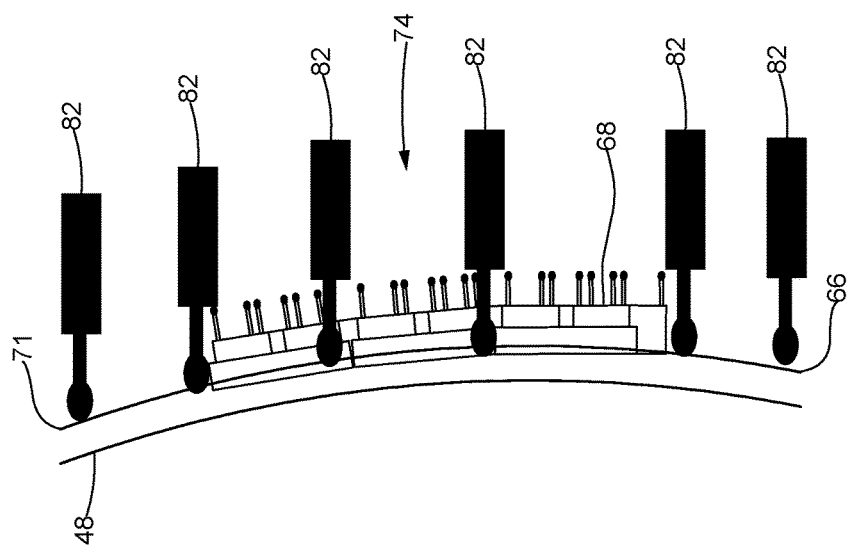
FIG. 5 is another side view of an additional embodiment of the surface treating assembly in accordance with the present disclosure.

Referring to FIG. 5, an additional embodiment of the surface treatment assembly 60 is shown. The surface treatment assembly 60 includes an adjustable base 66, two or more flexible support strips 71, a plurality of surface treatment applicator heads 68 which are configured to form the applicator head array 74 and at least one linear actuating device 82 coupled to the adjustable base 66 and flexible support strips 71 of the surface treatment assembly 60. In some embodiments, the adjustable base 66 and the flexible support strips 71 are formed of a flexible composite material which includes carbon fiber, glass fiber, or similar material. Furthermore, the adjustable base 66 and the flexible support strips 71 are configured to work with the at least one linear actuating device 82 to adjust and/or adapt the adjustable base 66 and flexible support strips 71 according to the variable geometry of the contoured surface 48.

In one non-limiting example, the at least one linear actuating device 82 is positioned in direct contact with the adjustable base 66 and flexible support strips 71. Additionally, the linear actuating device 82 is controlled by the controller 96 (FIG. 7) to actuate the adjustable base 66 and flexible support strips 71 according to the various geometries and dimensions of the contoured surface 48. For example, as the surface treatment assembly 60 moves along the contoured surface 48 the at least one linear actuating device 82 extends and/or contracts to adjust the contour of the adjustable base 66 and flexible support strips 71. In some embodiments, the at least one linear actuating device 82 changes the radius (i.e., increase or decrease) and/or adjusts other dimensions of the adjustable base 66 and flexible support strips 71 to ensure that the surface treatment assembly 60 follows the topography of the contoured surface 48. As a result, the surface treatment applicator heads 68 are positioned and orientated according to the contour of the adjustable base 66 and flexible strips 71 to ensure the applicator head array 74 is properly positioned (i.e., normal/orthogonal) relative to the contoured surface 48 of the fuselage 24.

Figure 6:
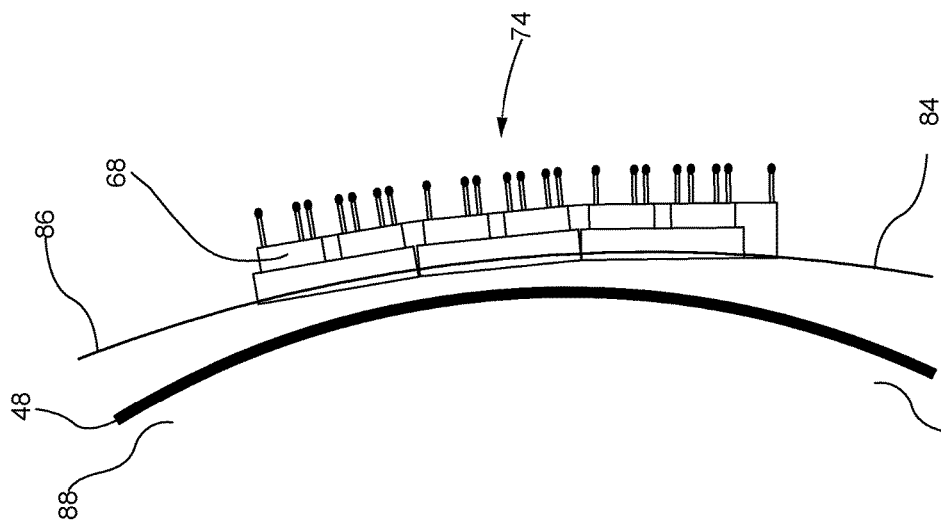
FIG. 6 is another side view of an additional embodiment of the surface treating assembly in accordance with the present disclosure.

FIG. 6 illustrates an additional embodiment of the surface treatment assembly 60 which uses an alternative adjustable base, alternative flexible support strips and/or an alternative actuating device. In the embodiment of FIG. 6, the surface treatment assembly 60 includes a magnetic composite adjustable base 84, including two or more magnetic flexible support strips 86. The magnetic composite adjustable base 84 and magnetic flexible support strips 86 are composed of a composite material that includes carbon-fiber, glass-fiber, or other such material, and a magnetic material dispersed within the composite material. The surface treatment assembly 60 further includes the plurality of surface treatment applicator heads 68, arranged into the applicator head array 74, and at least one magnetic actuating device 88 configured to actuate the magnetic composite adjustable base 84 and the magnetic flexible support strips 86 of the surface treatment assembly 60.

In one non-limiting example, the at least one magnetic actuating device 88 is an electromagnet arranged along the contoured surface 48 of the fuselage 24. Furthermore, the at least one magnetic actuating device 88 is arranged such that the magnetic actuating device 88 interacts with the magnetic composite adjustable base 84 and magnetic flexible support strips 86 of the surface treatment assembly 60. The at least one magnetic actuating device 88 is controlled by the controller 96 (FIG. 7) to adjust a magnetic field which is produced by the electromagnets of the one or more magnetic actuating device 88. As a result, the magnetic composite adjustable base 84 and magnetic flexible support strips 86 adapt and/or deform the surface treatment assembly 60 to follow the contour of the contoured surface 48 of the vehicle 20. As such, the magnetic composite adjustable base 84 and magnetic flexible support strips 86 provide adjustment and flexibility capabilities to the surface treatment assembly 60 allowing it to conform and follow the complex topography and variety of surface geometries (i.e., increased/decreased radii, and convex/concave surfaces) encountered along the contoured surface 48 of the fuselage 24, or other component, of the vehicle 20.

Referring back to FIG. 3 with continued reference to FIG. 2, the applicator head array 74 of the surface treatment assembly 60 is composed of a plurality of surface treatment applicator heads 68. In some embodiments, the plurality of surface treatment applicator heads 68 are a plurality of inkjet nozzles or other such fluid dispensing device that is configured to dispense a surface coating (i.e., ink, primer, paint, clear coat) on the contoured surface 48 of the fuselage 24, or other component, of the vehicle 20. Furthermore, in some embodiments, to supplement the adjustability of the adjustable base 66 and flexible support strips 71, the applicator head array 74 also includes adjustment capabilities to account for the changing geometries of the contoured surface 48. In one non-limiting example, the plurality of surface treatment applicator heads 68 is independently adjustable according to the changing dimensions and complex topography of the contoured surface 48 of the fuselage 24.

For example, the applicator head array 74 and the plurality surface treatment applicator heads 68 are independently controllable and adjustable in order to maintain a specified gap between the plurality of surface treatment applicator heads 68 of the applicator head array 74 and the contoured surface 48 of the fuselage 24. Additionally, each of the surface treatment applicator heads 68 are continuously monitored and adjusted to maintain a normal or orthogonal orientation between the plurality of surface treatment applicator heads 68 and the contoured surface 48 of the fuselage 24, or other component of the vehicle 20. Accordingly, in order to provide the individual control and adjustment capabilities, some embodiments of the applicator head array 74 and the plurality of surface treatment applicator heads 68 include at least one treatment assembly sensor 90 attached and positioned around the surface treatment assembly 60. The at least one surface treatment assembly sensor 90 is arranged around the applicator head array 74 and at least one of the surface treatment applicator heads 68. Moreover, each of the surface treatment assembly sensors 90 are configured to scan and collect surface topography data of the contoured surface 48 and the surrounding areas. The surface treatment assembly sensors 90 are configured to collect metrology and other surface profile data such as but not limited to, surface imaging data, location/positioning data, height sense data, angular orientation data, and any other such data related to the control and adjustment of the surface treatment assembly 60. Furthermore, in some embodiments, the surface treatment assembly sensors 90 are communicably coupled to the controller 96 (FIG. 7) and the controller 96 receives the data collected by each of the surface treatment assembly sensors 90.

Referring back to FIG. 2 and with continued reference to FIG. 3, the surface treatment assembly 60 applies a surface treatment layer 92 to the contoured surface 48 of the fuselage 24, or other component, of the vehicle 20. In one embodiment, the plurality of surface treatment applicator heads 68 of the applicator head array 74 applies the surface treatment layer 92 to the contoured surface 48. The surface treatment assembly 60 is moved along the contoured surface 48 by the gantry 62, the surface treatment AGV 64, or other such device, from the tail section 28 to the nose portion 46 of the fuselage 24. Alternatively, the surface treatment assembly 60 is positioned at an intermediate location along the fuselage 24 by the gantry 62, the surface treatment AGV 64, or other such device, and the plurality of surface treatment applicator heads 68 of the applicator head array 74 apply the surface treatment layer 92 on at least a portion of the contoured surface 48 of the fuselage 24.

The surface treatment assembly 60 is capable of being configured to apply a plurality of coatings which, either alone or in combination, compose the surface treatment layer 92. For example, the surface treatment assembly 60 is capable of applying a plurality of surface coatings, such as but not limited to, a surface protective layer, an adhesion promoting layer, a primer layer, a basecoat layer, a top coat layer, a clear coat layer, a decorative livery coating, or other known coatings. Moreover, the surface treatment assembly 60 is configured to jet, spray or otherwise apply the surface treatment layer 92 onto the contoured surface 48 in a single pass as the surface treatment assembly 60 moves along the contoured surface 48 of the fuselage 24. Additionally, the actuation and adjustment of the surface treatment assembly 60 enables a versatile and resilient response to the complex geometry and contour encountered along the contoured surface 48. In some embodiments, the adjustment capabilities provided by the surface treatment assembly 60 provides improved accuracy in the application of the surface treatment layer 92, as well as reduces the amount of time required to treat the contoured surface 48.

In some embodiments, the surface treatment layer 92 is composed of a single surface coating and is dispensed in a single pass along the contoured surface 48. However, additional numbers of passes are performed to apply the surface treatment layer 92 along the contoured surface 48, as needed. In one non-limiting example, the surface treatment assembly 60 is configured to apply a plurality of coatings that are combined to form the surface treatment layer 92. The surface treatment assembly 60 dispenses one coating at a time along the contoured surface 48 of the fuselage. As a result, the surface treatment assembly 60 makes one or more passes to dispense each of the plurality of coatings that comprise the surface treatment layer 92. Alternatively, two or more surface treatment assemblies 60 are configured to each apply a single coating as each of the two or more surface treatment assembly 60 move along the contoured surface 48 of the fuselage 24 to dispense the plurality of coatings that comprise the surface treatment layer 92.

FIG. 7, with continued reference to FIGS. 2-6, illustrates a schematic of a control and communication system 94 that is configured to operate and monitor the surface treatment assembly 60. The control and communication system 94 is composed of a controller 96 and an input/output terminal 98 which is communicably coupled to the controller 96. Furthermore, the controller 96 is programmed to control the movement of the surface treatment assembly 60, as well as, to control the movement and adjustment of the applicator head array 74 and the plurality of surface treatment applicator heads 68. In some embodiments, the controller 96 and the input/output terminal 98 are located remotely from the work area 50. As a result, communication between the controller 96, the input/output terminal 98 and the surface treatment assembly 60 is established using a radio frequency network, a computer data network, a Wi-Fi data network, a cellular data network, a satellite data network, or any other known data communication network. Alternatively, the controller 96 and the input/output terminal 98 are configured to be proximally located in the work area 50 and set up in a position adjacent to the surface treatment assembly 60. In the proximally located configuration, the controller 96 and the input/output terminal 98 still may be configured to communicate using a radio frequency network a computer data network, a Wi-Fi data network, a cellular data network, a satellite data network or any other known communication network.

A user of the control and communication system 94, such as an operator, a supervisor, or other interested personnel, can access the controller 96 using the input/output terminal 98. In some embodiments, the input/output terminal 98 allows for commands and other instructions to be input through a keyboard, mouse, dial, button, touch screen, microphone or other known input devices. Furthermore, data and other information generated by the control and communication system 94 and the controller 96 will be output to the input/output terminal 98 through a monitor, touch screen, speaker, printer, or other known output device for the user. In some embodiments, the input/output terminal 98 is communicably coupled to the controller 96 through a wired connection. Alternatively, the input/output terminal 98 is communicably coupled to the controller 96 through a wireless communication network such as Bluetooth, near-field communication, a radio frequency network, a computer data network, a Wi-Fi data network, a cellular data network, a satellite data network or any other known data communication network. In some embodiments, the input/output terminal 98 is a handheld mobile device, such as a tablet computer, a smart phone device, or other such mobile device, and the handheld mobile device is wirelessly coupled to the controller 96. As a result, one or more users of the control and communication system 94 can access the controller 96, each user having a different handheld input/output terminal 98 that is remotely located from the controller 96 and/or the surface treatment assembly 60. Such a configuration will allow for the flexibility in monitoring and operating the control and communication system 94 during treatment of the contoured surface 48 of the fuselage 24.

In some embodiments, the controller 96 of the control and communication system 94 is composed of one or more computing devices that are capable of executing a control mechanism and/or software which allows the user to direct and control the surface treatment assembly 60. The one or more computing devices of the controller 96 are programmed to control the movement of the gantry 62, the surface treatment AGV 64, or other movement device, to move the surface treatment assembly 60 within the work area 50. Furthermore, the one or more computing devices of the controller 96 are programmed to control the actuation and adjustment of the surface treatment assembly 60 to control the application of the surface treatment layer 92 on the contoured surface 48. In one exemplary application of the control and communication system 94, the user is able to use the controller 96 and input/output terminal 98 to program a pattern or process for the surface treatment assembly 60 to follow while applying the surface treatment layer 92 along the contoured surface 48. Furthermore, the communicably coupling of the controller 96, the input/output terminal 98, and the surface treatment assembly 60 using a communication network allows for two-way communication such that commands sent by the controller 96 are received by the surface treatment assembly 60, and data collected by the surface treatment assembly 60 is sent to and received by the controller 96.

In an embodiment, at least one surface treatment assembly sensor 90 is incorporated into the surface treatment assembly 60 and communicably coupled to the controller 96 and the input/output terminal 98. Additionally or alternatively, a plurality of surface treatment sensors 90 is mounted at various positions of the surface treatment assembly 60. The data collected by the surface treatment assembly sensors 90 is transmitted to and utilized by the controller 96. Furthermore, the controller 96 is programmed to store, analyze and extract information from the data collected by the plurality of sensors 90 and use the extracted information to control and adjust the surface treatment assembly 60. For example, the at least one surface treatment assembly sensor 90 includes a sensor, such as but not limited to, a vision sensor (i.e., camera), a laser scanning topography and surface height sense sensor (i.e., LIDAR), and other such surface metrology sensors.

Furthermore, the at least one surface treatment sensor 90 and the controller 96 are operably coupled which enables them to work together to detect change in the radius of the fuselage 24, collect imaging and vision data of the contoured surface 48, provide a topographical map of the contoured surface 48, provide positioning and location data of the surface treatment assembly 60, and provide any other such surface data collected by the at least one surface treatment assembly sensor 90. The collected data is then transmitted by the at least one surface treatment assembly sensor 90 and received by the controller 96 such that the control mechanism and/or software of the controller 96 is able to utilize the data to make adjustments to the control and operation of the surface treatment assembly 60. Additionally, the user is able to view the data collected by the at least one surface treatment assembly sensor 90 on the input/output terminal 98, and if necessary, make adjustments to the control commands sent from the controller 96 to the surface treatment assembly 60. In some embodiments, the control and communication system 94 is capable of making real time adjustments to the surface treatment assembly 60 through the two-way communication link established between the surface treatment assembly 60 and the control and communication system 94.

Figure 8:
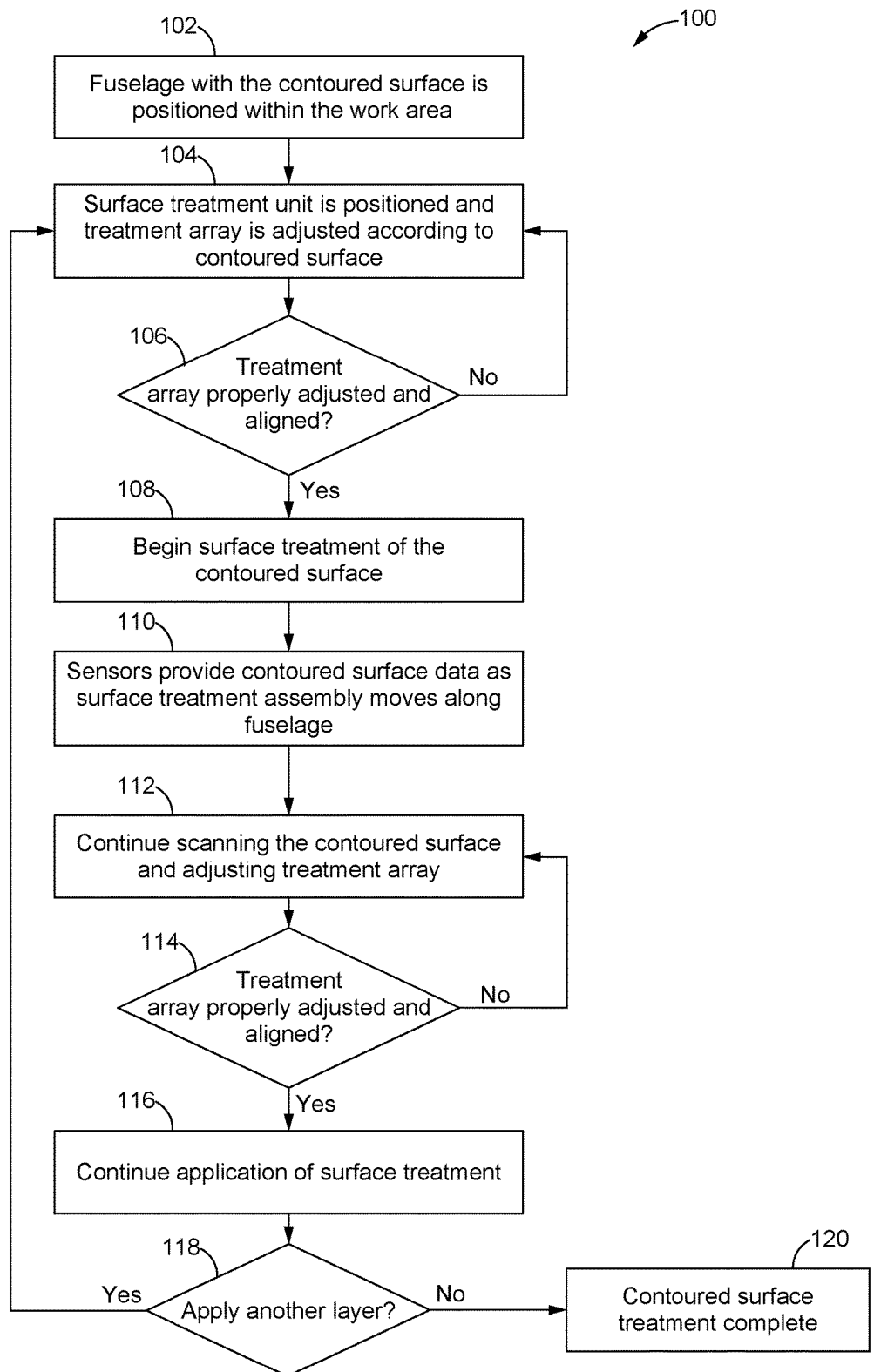
FIG. 8 is a flowchart illustrating an exemplary method of treating a contoured surface in accordance with the present disclosure.

Referring now to FIG. 8 and with continued reference to the proceeding FIGS. 1-7, a flowchart illustrating an exemplary surface treatment method or process 100 of treating a contoured surface is illustrated. In a first block 102 of the contoured surface treatment process 100, a structure having a contoured surface 48, such as an airplane fuselage 24, is prepared for surface treatment and positioned within the work area 50. In one non-limiting example, the surface preparation includes the removal of any protective or previously applied coatings on the contoured surface 48, masking certain areas of the contoured surface 48 not to be treated, abrading, cleaning, and drying the contoured surface 48, and any other surface preparations needed prior to the treatment of the contoured surface 48. Furthermore, prior to the start of the contoured surface treatment process 100, the structure including the contoured surface 48 (i.e., fuselage 24), is moved into the treatment position within the work area 50. In one non-limiting example the fuselage 24 is transported into the work area by one or more AGVs 52 and delivered to the nose support structure 54, the central support structure 56, or other support structures. During surface treatment, the fuselage 24 is supported by the nose and central support structures 54, 56, the one or more AGVs 52 and any other support structures that may be needed.

In a next block 104 of the contoured surface treatment process 100, the surface treatment assembly 60 is positioned within the work area 50 and adjusted and aligned along the contoured surface 48 of the fuselage 24. In one non-limiting example, during the adjustment and alignment of the surface treatment assembly 60 at least one surface treatment assembly sensor 90 is configured to scan and collect the surface topography data of the contoured surface 48. The surface topography data is then transmitted to and received by the controller 96 of the control and communication system 94 and utilized to adjust command and control parameters of the applicator head array 74 and the plurality of surface treatment applicator heads 68 to ensure a uniform application of the surface treatment layer 92. In some embodiments, the surface treatment layer 92 is at least one of a plurality of protective and preparation materials and coatings, such as but not limited to, a surface protective coating, an adhesion promoting coating, a primer coating, a basecoat coating, a sol-gel coating, a top layer coating, a decorative livery coating, a clear coating, and/or other protective and/or preparation coatings.

According to a next block 106, prior to the application of the surface treatment layer 92, an adjustment check is performed to confirm that the surface treatment assembly 60 is properly adjusted and aligned relative to the contoured surface 48. In some embodiments, the adjustment check includes confirmation of the proper dispense gap between the contoured surface 48 and each surface treatment applicator head 68 of the applicator head array 74. Additionally the adjustment check confirms that each surface treatment applicator head 68 is in a normal or orthogonal orientation relative to the contoured surface 48. Failure to properly adjust and align the surface treatment assembly 60 relative to the contoured surface 48 will result in a non-uniform application of the surface treatment layer 92, or other such defects. Therefore, if the inspection fails the set of predetermined adjustment criteria which are input into the controller 96, then the surface treatment assembly 60 continues adjustment of the plurality of surface treatment applicator heads 68 of the applicator head array 74 to correct any adjustment errors. In some embodiments, the operator or other user of the surface treatment assembly will be notified of the adjustment errors and instructed to make the necessary adjustment and alignment of the surface treatment assembly 60.

Once the surface treatment assembly 60 is properly adjusted and aligned, then in a next block 108 the surface treatment assembly 60 begins the application of the surface treatment layer 92. In some embodiments, the surface treatment assembly 60 starts the application of the surface treatment layer 92 at the tail section 28 of the vehicle 20 and moves towards the nose portion 46 of the fuselage 24. As the surface treatment assembly 60 moves along the fuselage 24, the plurality of surface treatment applicator heads 68 of the applicator head array 74 dispenses one of the plurality of protective and preparation coatings, such as but not limited to, a surface protective coating, an adhesion promoting coating, a primer coating, a basecoat coating, a sol-gel coating, a top layer coating, a decorative livery coating, a clear coating, and/or other protective and/or preparation coatings. Alternatively, the surface treatment assembly 60 starts the application of the surface treatment layer at an intermediate location between the tail section 28 and the nose portion 46 and the surface treatment assembly 60 dispenses the surface treatment layer 92 where directed.

In a next block 110 as the surface treatment assembly 60 moves along the contoured surface 48, the at least one surface treatment assembly sensor 90 continues to scan and collect data of the contoured surface 48 topography. In some embodiments, the data collected by the at least one surface treatment assembly sensor 90 is utilized by the controller 96 to make real-time adjustments to the surface treatment assembly 60 as it dispenses the surface treatment layer 92. For example, each surface treatment applicator head 68 of the applicator head array 74 are continuously adjusted to maintain a normal or orthogonal orientation with the contoured surface 48. Furthermore, the controller 96 continues to analyze the surface topography data collected by the at least one surface treatment assembly sensor 90 as the surface treatment assembly 60 continues moving along the contoured surface 48 of the fuselage 24.

As a result, in a next block 112 the control and communication system 94, which includes the controller 96, will continuously perform adjustment checks to confirm that each surface treatment applicator head 68 is properly adjusted, aligned, and orientated. In some embodiments, if one or more of the surface treatment applicator heads 68 are out of adjustment, alignment, and/or orientation, then the surface treatment assembly 60 will readjust those surface treatment applicator heads 68. In a next block 114, if it is determined the applicator head array 74 is out of alignment, then the surface treatment assembly 60 stops moving along the contoured surface 48 of the fuselage 24 in order to perform the readjustment. In some embodiments, the method 100 of treating a contoured surface returns to block 112 for readjustment of the applicator head array 74. In an alternative embodiment, the surface treatment assembly 60 moves along the contoured surface 48 at a slower pace in order to perform the readjustment and realignment of the surface treatment assembly 60.

Provided the surface treatment assembly 60 passes the continuous adjustment, alignment, and orientation checks, then in a next block 116 the surface treatment assembly 60 will continue dispensing the surface treatment layer 92 as it moves along the contoured surface 48. In a next block 118, when the surface treatment assembly 60 reaches the nose portion 46, or other pre-determined stopping point along the fuselage 24, the controller 96 makes a determination of whether another surface coating is required. If another coating is required, then in one non-limiting example, the method 100 of treating a contoured surface goes back to block 104 and the surface treatment assembly 60 is positioned at the designated starting position (i.e., the nose portion 46, the tail section 28 or alternative pre-determined starting point) and prepares to dispense the next coating along the contoured surface 48 of the fuselage 24. In some embodiments, the same surface treatment assembly 60 is used to apply the subsequent coatings or layers of the surface treatment layer 92 and the application process is repeated until all of the coatings or layers that comprise the surface treatment layer 92 have been applied to the contoured surface 48. Alternatively, in other embodiments, subsequent layers are applied to the contoured surface 48 using one or more additional surface treatment assembly 60, or other piece of surface treatment equipment. Once all of the desired coatings or layers which make up the surface treatment layer 92 have been applied, then in a next block 120, the surface treatment process is concluded and the fuselage 24 moves on to the next manufacturing or service step.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A surface treatment assembly for treating a contoured surface, the surface treatment assembly comprising:
    an adjustable base including a first flexible support strip and a second flexible support strip, the first and second flexible support strips being spaced apart from one another to define a mounting space there between, each of the first and second flexible support strips having at least a first contour shape and a second contour shape;
    a plurality of applicator heads coupled to the first and second flexible support strips of the adjustable base and arranged within the mounting space, each applicator head being configured to apply a surface treatment to the contoured surface; and
    an actuator operatively coupled to the adjustable base and configured to manipulate the first and second flexible support strips of the adjustable base between the first contour shape and the second contour shape, and wherein the actuator adjusts the adjustable base and the plurality of applicator heads to maintain a specified gap between the surface treatment assembly and the contoured surface.

2. The surface treatment assembly of claim 1, wherein the actuator comprises a pair of scissor arms operatively coupled to the adjustable base and configured to manipulate the first and second flexible support strips of the adjustable base between the first contour shape and the second contour shape.

3. The surface treatment assembly of claim 1, wherein the actuator comprises a plurality of linear actuators operatively coupled to the adjustable base, and configured to manipulate the first and second flexible support strips of the adjustable base between the first contour shape and the second contour shape.

4. The surface treatment assembly of claim 1, wherein each of the first and second flexible support strips of the adjustable base comprises a composite material.

5. The surface treatment assembly of claim 4, wherein the composite material comprises a magnetic material dispersed in a composite resin and the actuator comprises at least one electromagnet configured to manipulate the magnetic material and the composite resin between the first contour shape and the second contour shape.

6. The surface treatment assembly of claim 1, further comprising a sensor configured to detect an existing shape of the contoured surface and generate a contour data set, and a controller communicably coupled to the actuator to operate the actuator to manipulate the adjustable base based on the contour data set.

7. The surface treatment assembly of claim 1, wherein the plurality of applicator heads comprises a plurality of inkjet printing heads configured to apply the surface treatment to the contoured surface, and the surface treatment being a decorative layer.

8. The surface treatment assembly of claim 1, wherein the first contour shape comprises a first radius and the second contour shape comprises a second radius.

9. A method of treating a target area of a contoured surface, the method comprising:
    providing a plurality of applicator heads on an adjustable base including a first flexible support strip and a second flexible support strip, the first and second flexible support strips being spaced apart from one another to define a mounting space there between, each applicator head coupled to the first and second flexible support strips and arranged within the mounting space of the adjustable base and each applicator head being configured to apply a surface treatment to the contoured surface;
    determining an existing shape of the contoured surface;

manipulating the first and second flexible strips of the adjustable base with an actuator to a desired contoured shape based on the determined existing shape of the contoured surface, thereby to adjust the adjustable base and the plurality of applicator heads to maintain a specified gap between the surface treatment assembly and the contoured surface and to position the applicator heads adjacent to the target area; and selectively operating the plurality of applicator heads to apply the surface treatment to the target area of the contoured surface.

10. The method of claim 9, wherein the actuator comprises a pair of scissor arms operatively coupled the adjustable base, and manipulating the adjustable base comprises operating the pair of scissor arms.

11. The method of claim 9, wherein, the actuator comprises a plurality of linear actuators operatively coupled to the adjustable base, and manipulating the adjustable base comprises operating the plurality of linear actuators.

12. The method of claim 9, wherein the adjustable base comprises a magnetic material dispersed in a composite resin, the actuator comprises at least one electromagnet and manipulating the adjustable base comprises operating the at least one electromagnet.

13. The method of claim 9, wherein determining the existing shape of the contoured surface comprises scanning the contoured surface with a sensor.

14. The method of claim 9, wherein the plurality of applicator heads comprises a plurality of inkjet printing heads configured to apply the surface treatment to the targeted area, and the surface treatment being a decorative layer.

15. A surface treatment system for treating an exterior surface of an airplane, the treatment system comprising:

an adjustable base including a first flexible support strip and a second flexible support strip, the first and second flexible support strips being spaced apart from one another to define a mounting space there between, each of the first and second flexible support strips having at least a first radius and a second radius;

a plurality of applicator heads coupled to the first and second flexible support strips of the adjustable base and arranged within the mounting space, each applicator head being configured to apply a surface treatment to the exterior surface of the airplane;

an actuator operatively coupled to the adjustable base and configured to manipulate the first and second flexible support strips of the adjustable base between the at least first radius and the second radius, and the actuator adjusts the adjustable base and the plurality of applicator heads to maintain a specified gap between the surface treatment assembly and the contoured surface; and a controller communicably coupled to the actuator and programmed to:

operate the actuator to manipulate the adjustable base to the first radius or the second radius, and selectively operate the plurality of applicator heads to apply a surface treatment to the exterior surface of the airplane.

16. The surface treatment system of claim 15, wherein the actuator comprises a pair of scissor arms operatively coupled to the adjustable base and configured to manipulate the first and second flexible support strips of the adjustable base between at least the first radius and the second radius.

17. The surface treatment system of claim 15, wherein the actuator comprises a plurality of linear actuators operatively coupled to the adjustable base and configured to manipulate flexible support strips of the adjustable base between at least the first radius and the second radius.

18. The surface treatment system of claim 15, wherein each of the first and second flexible support strips of the adjustable base comprises a composite material.

19. The surface treatment system of claim 15, further comprising a sensor configured to detect an existing shape of the exterior surface of the airplane and generate a contour data set, and the controller operates the actuator to manipulate the adjustable base based on the contour data set.

20. The surface treatment system of claim 15, wherein the plurality of applicator heads comprises a plurality of inkjet printing heads configured to apply the surface treatment on the exterior surface, and the surface treatment being a decorative layer.

* * * * *